United States Patent
Du et al.

(10) Patent No.: US 12,503,693 B2
(45) Date of Patent: Dec. 23, 2025

(54) INTEGRATED SYSTEM FOR LIBRARY CONSTRUCTION, AFFINITY BINDER SCREENING AND EXPRESSION THEREOF

(71) Applicant: Adagene Inc., Jiangsu (CN)

(72) Inventors: Fangyong Du, Suzhou (CN); Peter Peizhi Luo, Suzhou (CN)

(73) Assignee: Adagene Inc., Jiangsu (CN)

( * ) Notice: Subject to any disclaimer, the term of this patent is extended or adjusted under 35 U.S.C. 154(b) by 1007 days.

(21) Appl. No.: 17/540,159

(22) Filed: Dec. 1, 2021

(65) Prior Publication Data

US 2022/0090053 A1 Mar. 24, 2022

Related U.S. Application Data

(62) Division of application No. 14/774,722, filed as application No. PCT/CN2013/072631 on Mar. 14, 2013, now abandoned.

(51) Int. Cl.
*C07K 16/00* (2006.01)
*C07K 14/00* (2006.01)
*C12N 15/10* (2006.01)

(52) U.S. Cl.
CPC .......... *C12N 15/1037* (2013.01); *C07K 14/00* (2013.01); *C07K 16/00* (2013.01); *C12N 15/1058* (2013.01)

(58) Field of Classification Search
CPC ............................. C12N 15/1037; C07K 16/00
See application file for complete search history.

(56) References Cited

U.S. PATENT DOCUMENTS

| | | |
|---|---|---|
| 5,223,409 A | 6/1993 | Ladner et al. |
| 5,403,484 A | 4/1995 | Ladner et al. |
| 5,427,908 A | 6/1995 | Dower et al. |
| 5,432,018 A | 7/1995 | Dower et al. |
| 5,498,530 A | 3/1996 | Schatz et al. |
| 5,498,538 A | 3/1996 | Kay et al. |
| 5,571,689 A | 11/1996 | Heuckeroth et al. |
| 5,580,717 A | 12/1996 | Dower et al. |
| 5,627,024 A | 5/1997 | Maruyama et al. |
| 5,663,143 A | 9/1997 | Ley et al. |
| 5,698,426 A | 12/1997 | Huse |
| 5,723,286 A | 3/1998 | Dower et al. |
| 5,723,323 A | 3/1998 | Kauffman et al. |
| 5,734,018 A | 3/1998 | Rutter et al. |
| 5,763,192 A | 6/1998 | Kauffman et al. |
| 5,766,905 A | 6/1998 | Studier et al. |
| 5,770,434 A | 6/1998 | Huse |
| 6,057,098 A | 5/2000 | Buechler et al. |
| 7,811,973 B2 | 10/2010 | Burioni et al. |
| 8,227,242 B2 | 7/2012 | Bradbury |
| 2009/0111126 A1* | 4/2009 | Akamatsu ............ C07K 16/244 435/320.1 |
| 2010/0093563 A1 | 4/2010 | Williamson et al. |
| 2010/0113304 A1* | 5/2010 | Hufton ............... C12N 15/1037 435/243 |

FOREIGN PATENT DOCUMENTS

| | | |
|---|---|---|
| CN | 1485432 A | 3/2004 |
| CN | 101258243 A | 9/2008 |
| JP | 2007124915 A | 5/2007 |
| JP | 2008154557 A | 7/2008 |
| WO | WO-1995034683 A1 | 12/1995 |
| WO | WO-1997009446 A1 | 3/1997 |
| WO | WO-1997035196 A1 | 9/1997 |
| WO | WO-1997046251 A1 | 12/1997 |
| WO | WO-1997047314 A1 | 12/1997 |
| WO | WO-1998014277 A1 | 4/1998 |
| WO | WO-1998015833 A1 | 4/1998 |
| WO | WO-1998020036 A1 | 5/1998 |
| WO | WO-1998020159 A1 | 5/1998 |
| WO | WO-1998020169 A1 | 5/1998 |
| WO | WO-2002088315 A2 | 11/2002 |
| WO | WO-2007007154 A2 | 1/2007 |

OTHER PUBLICATIONS

Pershad et al. Drop-out phagemid vector for switching from phage displayed affinity reagents to expression formats. Anal. Biochem. 412: 210-216. (Year: 2011).*
Leo et al. Deamidation at Asparagine and Glutamine As a Major Modification upon Deterioration/Aging of Proteinaceous Binders in Mural Paintings. Anal. Chem. 83: 2056-2064. (Year: 2011).*
Nagesha et al. Application of linker-ligation-PCR for construction of phage display epitope libraries. Journal of Virological Methods 60: 147-154. (Year: 1996).*
Extended European Search Report issued in European Application No. 13877452.6 mailed Sep. 5, 2016, 6 pages.
GenBank, (2004). Enterobacteria phage M13, Accession No. NC_003287, Available online at <https://www.ncbi.nlm.nih.gov/nuccore/56718463?sat=34&satkey=5040830>, 5 pages.
Hoet et al., (2005). "Generation of high-affinity human antibodies by combining donor-derived and synthetic complementarity-determining-region diversity," Nature Biotechnology, 23(3):344-348.
Kim et al., (2000). "Bacterial Cell Surface Display of an Enzyme Library for Selective Screening of Improved Cellulase Variants," Appl Environ Microbiol., 66(2):788-793.

(Continued)

*Primary Examiner* — James D Schultz
*Assistant Examiner* — Keenan A Bates
(74) *Attorney, Agent, or Firm* — Morrison & Foerster LLP

(57) ABSTRACT

A recombinant polynucleotide suitable for use in a display vector is provided. The recombinant polynucleotide includes from 5' to 3': a first nucleic acid sequence (or insert) encoding an amino acid sequence to be displayed on a surface; a first pre-selected restriction site; a second nucleic acid sequence encoding a surface peptide capable of being displayed on the surface; and a second pre-selected restriction site. Corresponding display vectors that can be converted into expression vectors in a high-throughput fashion, as well as methods of use thereof, are also provided.

6 Claims, 3 Drawing Sheets

(56) References Cited

OTHER PUBLICATIONS

International Search Report and Written Opinion received for International Patent Application No. PCT/CN2013/072631 mailed Dec. 19, 2013, 10 pages.

Efimov et al., (1995). "Bacteriophage T4 as a surface display vector," Virus Genes, 10:173-177.

Jiang et al., (1997). "Display of a PorA peptide from Neisseria meningitidis on the bacteriophage T4 capsid surface," Infection & Immunity, 65(11):4770-4777.

Pershad et al., (2011). "Drop-out phagemid vector for switching from phage displayed affinity reagents to expression formats," Anal. Biochem., 412(2):210-216, 15 pages.

Ren et al., (1996). "Phage display of intact domains at high copy No. a system based on SOC, the small outer capsid protein of bacteriophage T4," Protein Sci., 5(9):1833-1843.

Smith et al., (1993). "Libraries of peptides and proteins displayed on filamentous phage," Methods in Enzymology, 217:228-257.

Zhu et al., (1998). "Inhibition of Vascular Endothelial Growth Factor-induced Receptor Activation with Anti-Kinase Insert Domain-containing Receptor Single-Chain Antibodies from a Phage Display Library," Cancer Research, 58(15):3209-3214.

Al-Lazikani et al., (1997). "Standard conformations for the canonical structures of immunoglobulins," J. Molec. Biol., 273:927-948.

Ren et al., (1997). "Cloning of linear DNAs in vivo by overexpressed T4 DNA ligase: construction of a T4 phage hoc gene display vector," Gene, 195(2):303-311.

Ren et al., (1998). "Phage T4 SOC and HOC display of biologically active, full-length proteins on the viral capsid," Gene, 215:439-444.

Wang et al., (2010). "Adapter-Directed Display: A Modular Design for Shuttling Display on Phage Surfaces," J. Mol. Biol., 395:1088-1101.

Wang et al., (2010). "Yeast surface display of antibodies via the heterodimeric interaction of two coiled-coil adapters," Journal of Immunological Methods, 354:11-19.

* cited by examiner

INTEGRATED SYSTEM FOR LIBRARY CONSTRUCTION, AFFINITY BINDER SCREENING AND EXPRESSION THEREOF

CROSS REFERENCE TO RELATED APPLICATIONS

This application is a divisional of U.S. patent application Ser. No. 14/774,722, filed on Sep. 11, 2015, which is a national stage application under 35 U.S.C. § 371 of International Application No. PCT/CN2013/072631, filed internationally on Mar. 14, 2013.

TECHNICAL FIELD OF THE INVENTION

This application pertains to the construction and screening of display libraries, particularly the design and use of vectors therefore.

BACKGROUND OF THE INVENTION

High throughput screening for affinity binders, such as antibodies, that bind specifically to a target, such as antigens, was made possible by surface display technologies, including phage display, ribosomal/mRNA display, yeast display and mammalian display. Various display vectors have been developed such that upon expression, libraries of peptides or proteins can be displayed on the surface of phage, bacteria, yeast or mammalian cells. Affinity binders can then be identified through library screening and selection processes such as phage panning or fluorescence-activated cell sorting (FACS). Thereafter, clones corresponding to the affinity binders must be further characterized to ascertain the identity of the binders, as well as for downstream applications.

Conventionally, inserts from binding clones are transferred or subcloned into expression vectors, either individually or en masse, such that the inserts can be expressed, purified and/or further characterized. However, this subcloning process for transferring inserts from display vectors to expression vectors is time consuming, laborious, and low throughput. In addition, the efficiency of subcloning is low and unpredictable, varying from about 50% to 80%. Thus, a need exists for a fast, inexpensive and high-throughput method to accelerate the affinity binder identification and characterization processes.

SUMMARY OF THE INVENTION

Aspects of the invention relate to the design and use of vectors for high-throughput conversion, e.g., from display to expression. In some embodiments, the design requires judicious engineering of restriction enzyme sites at specific sequence locations, and employment of combinations of restriction enzymes and DNA ligases to facilitate the conversion. Various libraries can be constructed using vectors of the present invention to enable high-throughput library screening, binder selection/recovery, and binder characterization. Upon implementation of such high-throughput processes, it has been surprisingly discovered that a high conversion rate (e.g., over 90%, over 95%, or close to 100%) can be achieved, thereby greatly accelerating the binder discovery and characterization processes.

In one aspect, a recombinant polynucleotide suitable for use to construct various vectors is provided. The recombinant polynucleotide comprises from 5' to 3': a first nucleic acid sequence encoding an amino acid sequence to be displayed on a surface; a first restriction site selected from the group consisting of XbaI, NcoI, SalI and XhoI sites; a second nucleic acid sequence encoding a surface peptide capable of being displayed on the surface; and a second restriction site selected from the group consisting of XbaI, NcoI, SalI and XhoI sites. In various embodiments, the first nucleic acid sequence is engineered in-frame with the second nucleic acid sequence. The first and second restriction sites, when cleaved by corresponding restriction endonuclease thereto, produce compatible sticky ends.

In some embodiments, the first nucleic acid sequence encodes an antibody fragment such as Fab. The second nucleic acid sequence may encode a phage coat protein, a yeast outer wall protein, a bacterial outer membrane protein, a cell surface tether domain, or an adapter, or a truncation or derivative thereof. For example, the second nucleic acid sequence can be gene III of filamentous phage M13, or a truncation or derivative thereof. The second nucleic acid sequence can also encode an adapter capable of binding to a binding partner, wherein said binding partner is expressed as a fusion and directly displayed on the surface. Correspondingly, the surface peptide can be for phage display, yeast display, bacterial display or mammalian display, or shuttling display between different hosts (e.g., via adapters). In various embodiments, when expressed, the surface peptide and the amino acid sequence encoded by the first nucleic acid sequence are displayed as a fusion protein on the surface.

In certain embodiments, the first and second restriction site each encode amino acids that do not interfere with binding affinity of the amino acid sequence, and/or display of the surface peptide or fusion protein. In some embodiments, the first and/or second restriction site is XbaI site.

In another aspect, a display vector for high-throughput conversion into expression vector is provided. The display vector comprises the recombinant polynucleotide described herein and a fusion tag sequence 5' to the first restriction site or 3' to the second restriction site. In some embodiments, when the fusion tag sequence is 3' to the second restriction site, it is engineered such that upon (a) removal of the second nucleic acid sequence by cleaving the first and second restriction site, and (b) religation of the compatible sticky ends produced therefrom, the first nucleic acid sequence is in-frame with the fusion tag sequence. The fusion tag sequence can be selected from one or more of: an alkaline phosphatase tag, an AviTag, a cutinase tag, a halotag, a flag tag, a c-myc tag, a histidine tag, a GST tag, a green fluorescent protein tag, an HA tag, an E-tag, a Strep tag, a Strep tag 11 and a YoI 1/34 tag. Such display vector can be provided in a library of display vectors in which each display vector has a unique first nucleic acid sequence, thereby forming a library for selection.

In a further aspect, a method of converting a display vector to an expression vector is provided. The method includes: providing the display vector described herein; cleaving the first and second restriction site with corresponding restriction endonuclease thereto, thereby producing said compatible sticky ends; and religating the compatible sticky ends to produce an expression vector in which the first nucleic acid sequence is in-frame with the fusion tag sequence.

In some embodiments, the method can further include cleaving within the second nucleic acid sequence to increase religation efficiency in the religating step. In certain embodiments, before the religating step, a product from the cleaving step can be diluted to increase intramolecular ligation.

In various embodiments, after the religating step, the expression vector produced therefrom can be introduced into a host, to further characterize the first nucleic acid sequence. Exemplary further characterization includes sequencing the first nucleic acid sequence and/or expressing the first nucleic acid sequence.

In various embodiments, the method is a high-efficiency method. For example, the providing, cleaving, religating and introducing steps can be completed in less than 12 hours, in less than 8 hours, or in less than 4 hours.

The method can be performed in a high-throughput manner where a plurality of display vectors can be converted to a plurality of expression vectors in parallel. Thereafter, the plurality of expression vectors can be introduced into a population of hosts for further characterization. Such high-throughput conversion can have a conversion rate (from the plurality of display vectors to the plurality of expression vectors) that is higher than 90%, higher than 95%, or higher than 98%.

In yet another aspect, a method of identifying an affinity binder to a target is provided. The method includes: screening a population of first hosts each containing the display vector described herein, to obtain a subpopulation of first hosts having binding affinity to a target, wherein each first host displays, on a surface of said first host, the amino acid sequence encoded by a unique first nucleic acid sequence in the display vector, and wherein said subpopulation of first hosts each display an affinity binder to said target; converting display vectors isolated from said subpopulation of first hosts to expression vectors by cleaving the first and second restriction site to remove the second nucleic acid sequence and religating the compatible sticky ends produced therefrom; and introducing said expression vectors into a population of second hosts, to further characterize the affinity binder. In various embodiments, the method can be performed in a high-throughput fashion, wherein the converting step can have a conversion rate that is higher than 90%, higher than 95%, or higher than 98%.

Also provided are libraries and kits constructed using the vectors described herein and for carrying out the methods described herein. Further provided are sublibraries generated during the screening process and affinity binders obtained from methods described herein.

DETAILED DESCRIPTION OF THE INVENTION

Figure 1:
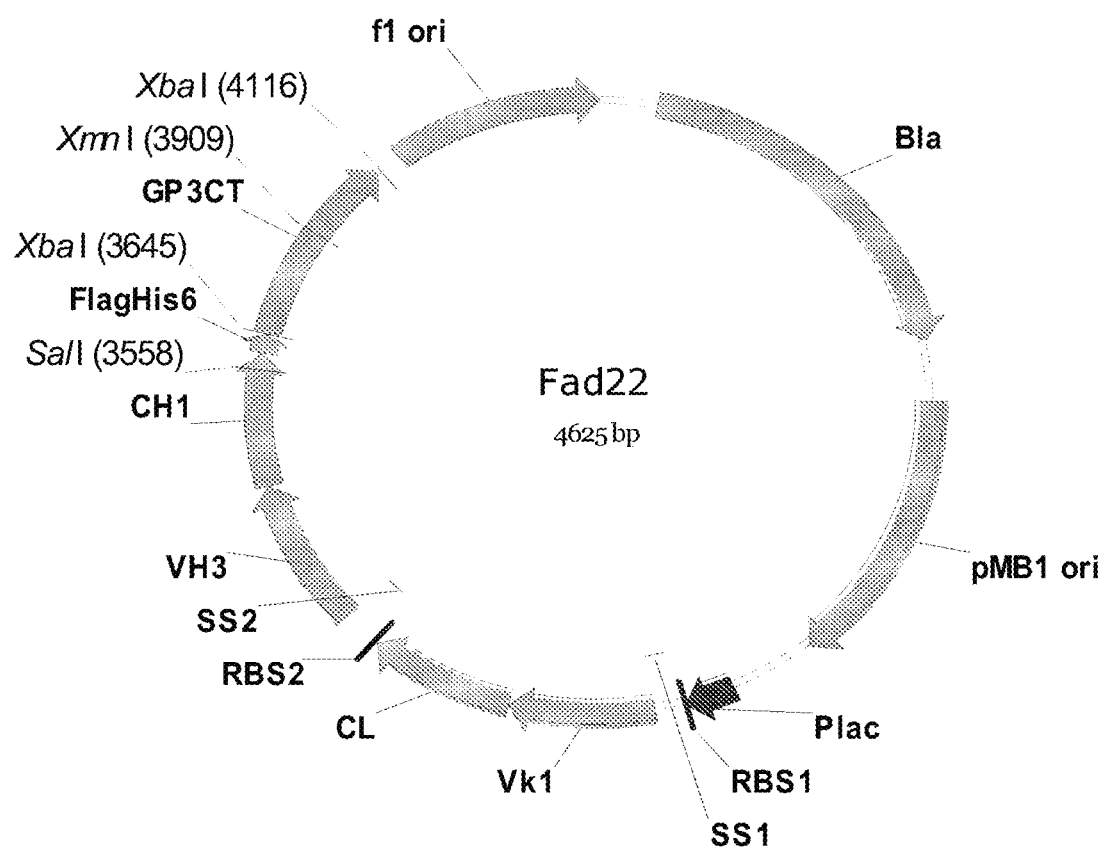
FIG. 1 provides a schematic restriction map showing an exemplary vector of the present invention.

This invention relates to a high-throughput process which integrates affinity binder discovery with downstream characterization thereof. Such high-throughput process has been surprisingly shown to save tremendous amount of time and effort. As a result, the entire process from library screening, binder selection, to binder characterization can be streamlined, while dramatically accelerating the pace of affinity binder discovery and characterization. In practice, the high-throughput process of the present invention is commercially desirable in affinity reagents discovery, and can be applied to various display platforms, including phage display, bacterial display, yeast display, mammalian display, as well as other display systems.

It is to be understood that both the foregoing general description and the following detailed description are exemplary and explanatory only and are not restrictive of the compositions and methods described herein. In this application, the use of the singular includes the plural unless specifically stated otherwise. Also, the use of "or" means "and/or" unless state otherwise. Similarly, "comprise," "comprises," "comprising," "include," "includes" and "including" are not intended to be limiting. It is understood that aspects and embodiments of the invention described herein include "consisting" and/or "consisting essentially of" aspects and embodiments.

Definitions

For convenience, certain terms employed in the specification, examples, and appended claims are collected here. Unless defined otherwise, all technical and scientific terms used herein have the same meaning as commonly understood by one of ordinary skill in the art to which this invention belongs.

As used herein, the following terms and phrases are intended to have the following meanings:

The articles "a" and "an" are used herein to refer to one or to more than one (i.e., to at least one) of the grammatical object of the article. By way of example, "an element" means one element or more than one element.

By "a population of hosts" is meant a group of hosts into which a library of polynucleotides can be introduced and displayed. The host can be phages, yeasts, bacteria or mammalian cells. In some embodiments, a population of cells from a monoculture, i.e., wherein each cell in the population is of the same cell type can be used. Alternatively, mixed cultures of cells can also be used. Cells may be adherent, i.e., cells which grow attached to a solid substrate, or, alternatively, the cells may be in suspension. Mammalian cells may be cells derived from primary tumors, cells derived from metastatic tumors, primary cells, cells which have lost contact inhibition, transformed primary cells, immortalized primary cells, cells which may undergo apoptosis, and cell lines derived there from.

As used herein, the term "about" means within 20%, more preferably within 10% and most preferably within 5%.

The terms "affinity binder," "binder," and "binding protein" are used interchangeably to refer to a peptidic chain having a specific or general affinity with another protein or molecule. Proteins are brought into contact and form a complex when binding is possible. The affinity binder of the invention expressed on the surface of a host can preferably be an antibody, a fragment or derivative of an antibody, a protein or a peptide. An antibody or a peptide "affinity binds," "specifically binds" or "preferentially binds" to an antigen or a target if it binds with greater affinity, avidity, more readily, and/or with greater duration than it binds to other substances. It is understood by reading this definition that, for example, an antibody or a peptide that specifically or preferentially binds to a first target may or may not specifically or preferentially bind to a second target. As such, "affinity binding," "specific binding" or "preferential binding" does not necessarily require (although it can include) exclusive binding. In some embodiments, "specific binding" means that the protein exhibits appreciable affinity for a particular antigen or epitope and, generally, does not exhibit significant cross-reactivity. An antigen binding to protein that "does not exhibit significant cross-reactivity" is one that will not appreciably bind to an entity other than its target (e.g., a different epitope or a different molecule). An antigen specific protein specific for a particular epitope will, for example, not significantly cross-react with remote epitopes on the same protein or peptide. Specific binding can be determined according to any art-recognized means for determining such binding. Preferably, specific binding is determined according to Scatchard analysis and/or competitive binding assays. "Affinity" binding includes binding with an affinity of at least $10^6$, $10^7$, $10^8$, $10^9$ M$^{-1}$, or $10^{10}$ M$^{-1}$. Antigen binding proteins with affinities greater than $10^7$ M$^{-1}$ or $10^8$ M$^{-1}$ typically bind with correspondingly greater specificity.

As used herein, the term "amino acid sequence" refers to a sequence of contiguous amino acid residues of any length. The terms "polypeptide," "peptide," "oligopeptide," or "protein" may be used interchangeably herein with the term "amino acid sequence."

An "antibody" is an immunoglobulin molecule capable of specific binding to a target, such as a carbohydrate, polynucleotide, lipid, polypeptide, etc., through at least one antigen recognition site, located in the variable region of the immunoglobulin molecule. As used herein, the term encompasses not only intact polyclonal or monoclonal antibodies, but also fragments thereof (such as Fab, Fab', F(ab')$_2$, Fv), single chain (ScFv), mutants thereof, naturally occurring variants, fusion proteins comprising an antibody portion with an antigen recognition site of the required specificity, humanized antibodies, chimeric antibodies, and any other modified configuration of the immunoglobulin molecule that comprises an antigen recognition site of the required specificity.

"Antibody fragments" comprise only a portion of an intact antibody, generally including an antigen binding site of the intact antibody and thus retaining the ability to bind antigen. Examples of antibody fragments encompassed by the present definition include: (i) the Fab fragment, having VL, CL, VH and CH1 domains; (ii) the Fab' fragment, which is a Fab fragment having one or more cysteine residues at the C-terminus of the CH1 domain; (iii) the Fd fragment having VH and CH1 domains; (iv) the Fd' fragment having VH and CH1 domains and one or more cysteine residues at the C-terminus of the CH1 domain; (v) the Fv fragment having the VL and VH domains of a single antibody; (vi) the dAb fragment which consists of a VH domain; (vii) isolated CDR regions; (viii) F(ab')$_2$ fragments, a bivalent fragment including two Fab' fragments linked by a disulfide bridge at the hinge region; (ix) single chain antibody molecules (e.g. single chain Fv; scFv); (x) "diabodies" with two antigen binding sites, comprising a heavy chain variable domain (VH) connected to a light chain variable domain (VL) in the same polypeptide chain; (xi) "linear antibodies" comprising a pair of tandem Fd segments (VH-CH1-VH-CH1) which, together with complementary light chain polypeptides, form a pair of antigen binding regions.

The term "antibody variant" as used herein refers to an antibody with single or multiple mutations in the heavy chains and/or light chains. In some embodiments, the mutations exist in the variable region. In some embodiments, the mutations exist in the constant region.

The term "binding partner" is used interchangeably with "target" to refer to a molecule that is recognized and binds to a peptide or protein. The binding partner can be an antigen or epitope thereof when binding to an antibody or an antibody fragment. Binding partners can be used in a screen to identify affinity binders thereto.

"Biopanning" is an affinity selection technique which selects for peptides that bind to a given target. Biopanning involves three major steps: capturing affinity binders with a target ("panning") using a previously constructed library, washing, and elution. Details are provided hereunder.

A "cell surface tether domain" as used herein, refers to an amino acid sequence that confers the ability of a polypeptide to be associated with a host cell outer membrane, and which is sometimes but not always naturally present in the protein of interest. As described herein, cell surface tether domains include, for example, transmembrane domains or glycosidylphosphatidylinositol signal sequences.

"Chimeric antibodies" refers to those antibodies wherein one portion of each of the amino acid sequences of heavy and light chains is homologous to corresponding sequences in antibodies derived from a particular species or belonging to a particular class, while the remaining segment of the chains is homologous to corresponding sequences in another. Typically, in these chimeric antibodies, the variable region of both light and heavy chains mimics the variable regions of antibodies derived from one species of mammals, while the constant portions are homologous to the sequences in antibodies derived from another. One clear advantage to such chimeric forms is that, for example, the variable regions can conveniently be derived from presently known sources using readily available hybridomas or B cells from non human host organisms in combination with constant regions derived from, for example, human cell preparations. While the variable region has the advantage of ease of preparation, and the specificity is not affected by its source, the constant region being human, is less likely to elicit an immune response from a human subject when the antibodies are injected than would the constant region from a non-human source. However, the definition is not limited to this particular example.

As generally understood, a "codon" is a series of three nucleotides (triplets) that encodes a specific amino acid residue in a polypeptide chain or for the termination of translation (stop codons). There are 64 different codons (61 codons encoding for amino acids plus 3 stop codons) but only 20 different translated amino acids. The overabundance in the number of codons allows many amino acids to be encoded by more than one codon. Different organisms (and organelles) often show particular preferences or biases for one of the several codons that encode the same amino acid.

A "constant region" of an antibody refers to the constant region of the antibody light chain or the constant region of the antibody heavy chain, either alone or in combination. The constant regions of the light chain (CL) and the heavy chain (CH1, CH2 or CH3, or CH4 in the case of IgM and IgE) confer important biological properties such as secretion, transplacental mobility, Fc receptor binding, complement binding, and the like. By convention the numbering of the constant region domains increases as they become more distal from the antigen binding site or amino-terminus of the antibody.

"Degenerate sequences" are nucleic acid sequences having a length of N1 nucleosides and comprises up to $4^{N1}$ different sequences. In general, a sequence is called "degenerate" if some or all of its positions have several possible bases or substitutions. Assuming $\Sigma=\{T, C, A, G\}$ is the DNA alphabet, a sequence (e.g. a primer) can be shown as $S=x_1 x_2 \ldots x_l$, where $x_i \subseteq \Sigma$, $x_i \neq \emptyset$ and l is the length of S. The degeneracy of a sequence is the number of unique sequence combinations it contains, which can be calculated as $d(S)=\Pi_{i=1}^{l}|x_i|$. In some embodiments, degenerate codon substitutions may be achieved by generating sequences in which the third position of one or more selected (or all) codons is substituted with mixed-base and/or deoxyinosine residues. The degeneracy can also be selective or constrained where only a selected subset of positions is subject to substitutions, and/or one or more or all positions are substituted with constraints by optimizing the composition and ratio of the mixed-base and/or deoxyinosine residues.

"Display" refers to presentation of different recombinant polypeptides on the surface of a host such as phages, yeasts, bacteria and mammalian cells.

As used herein, the term "display vector" refers to a plasmid or phage DNA or other DNA sequence which is able to replicate autonomously in a host, and capable of expressing and displaying an insert in the vector as part of a fusion protein on the surface of the host.

"Diversity" of a library refers to the number of different recombinant polypeptides encoded by the polynucleotides in the library.

The term "expression vector" refers to a vector capable of expressing of a gene or any open reading frame that has been cloned into it. Such expression can occur after transformation into a host cell, or in in vitro systems. The cloned DNA or insert is usually operably linked to one or more regulatory sequences, such as promoters, activator/repressor binding sites, terminators, enhancers and the like.

The term "fuse," "fusion" or "link" refers to the covalent linkage between two polypeptides in a single protein. The polypeptides are typically joined via a peptide bond, either directly to each other or via an amino acid linker. Optionally, the peptides can be joined via non-peptide covalent linkages known to those of skill in the art.

As used herein, the term "fusion tag" is a peptide or protein located either on the C- or N-terminal of the target protein, which improves one or more of: solubility, detection, purification, expression of the target protein. The fusion tag is generally engineered in-frame with the target protein. Commonly used fusion tags include but are not limited to: alkaline phosphatase tag, AviTag, cutinase tag, halotag, flag tag, c-myc tag, histidine (His) tag, GST tag, green fluorescent protein (GFP) tag, HA tag, E-tag, Strep tag, Strep tag II and YoI 1/34 tag.

The term "heavy chain" as used herein refers to the larger immunoglobulin subunit which associates, through its amino terminal region, with the immunoglobulin light chain. The heavy chain comprises a variable region (VH) and a constant region (CH). The constant region further comprises the CH1, hinge, CH2, and CH3 domains. In the case of IgE, IgM, and TgY, the heavy chain comprises a CH4 domain but does not have a hinge domain. Those skilled in the art will appreciate that heavy chains are classified as gamma, mu, alpha, delta, or epsilon ($\gamma$, $\mu$, $\alpha$, $\delta$, $\epsilon$), with some subclasses among them (e.g., $\gamma1$-$\gamma4$). It is the nature of this chain that determines the "class" of the antibody as IgG, IgM, IgA IgG, or IgE, respectively. The immunoglobulin subclasses (isotypes), e.g., IgG1, IgG2, IgG3, IgG4, IgA1, etc. are well characterized and are known to confer functional specialization.

A "host" is intended to include any individual virus or cell or culture thereof that can be or has been a recipient for vectors or for the incorporation of exogenous nucleic acid molecules, polynucleotides, and/or proteins. It also is intended to include progeny of a single virus or cell. The progeny may not necessarily be completely identical (in morphology or in genomic or total DNA complement) to the original parent cell due to natural, accidental, or deliberate mutation. The virus can be phage. The cells may be prokaryotic or eukaryotic, and include but are not limited to bacterial cells, yeast cells, insect cells, animal cells, and mammalian cells, e.g., murine, rat, simian, or human cells.

"Humanized" antibodies refer to a molecule having an antigen-binding site that is substantially derived from an immunoglobulin from a non-human species and the remaining immunoglobulin structure of the molecule based upon the structure and/or sequence of a human immunoglobulin. The antigen-binding site may comprise either complete variable domains fused onto constant domains or only the complementarity determining regions (CDRs) grafted onto appropriate framework regions in the variable domains. Antigen binding sites may be wild type or modified by one or more amino acid substitutions, e.g., modified to resemble human immunoglobulin more closely. Some forms of humanized antibodies preserve all CDR sequences (for example, a humanized mouse antibody which contains all six CDRs from the mouse antibodies). Other forms of humanized antibodies have one or more CDRs (one, two, three, four, five, six) which are altered with respect to the original antibody, which are also termed one or more CDRs "derived from" one or more CDRs.

A gene or reading frame is "in-frame" with another when the two genes or reading frames are cloned together to generate a contiguous reading frame, without disrupting the codons therein, such that when expressed, a fusion protein expressing both genes or reading frames are produced. Generally the upstream gene or reading frame is an open reading frame. A reading frame is a way of dividing the sequence of nucleotides in a nucleic acid into a set of consecutive, non-overlapping codons. An open reading frame (ORF) is a reading frame that contains a start codon, and a subsequent region which usually has a length which is a multiple of 3 nucleotides, but does not contain a stop codon in a given reading frame.

An "insert" as used herein, is a heterologous nucleic acid sequence that is ligated into a compatible site into a vector. An insert may comprise one or more nucleic acid sequences that encode a polypeptide or polypeptides. An insert may comprise regulatory regions or other nucleic acid elements.

An "isolated" or "purified" polypeptide or polynucleotide, e.g., an "isolated polypeptide," or an "isolated polynucleotide" is purified to a state beyond that in which it exists in nature. For example, the "isolated" or "purified" polypeptide or polynucleotide, can be substantially free of cellular material or other contaminating proteins from the cell or tissue source from which the protein or polynucleotide is derived, or substantially free from chemical precursors or other chemicals when chemically synthesized. The preparation of antigen binding protein having less than about 50% of non-antigen binding protein (also referred to herein as a "contaminating protein"), or of chemical precursors, is considered to be "substantially free." 40%, 30%, 20%, 10% and more preferably 5% (by dry weight), of non-antigen binding protein, or of chemical precursors is considered to be substantially free.

"Library" used herein refers to a diverse collection or mixture of polynucleotides comprising polynucleotides encoding different recombinant polypeptides. In certain embodiments, a library of polynucleotides may comprise at least $10^6$, $10^7$, $10^8$, $10^9$, $10^{10}$, $10^{11}$, $10^{12}$, $10^{13}$, $10^{14}$, $10^{15}$, or more or less different polynucleotides within a given collection of polynucleotides. Typically, the different polynucleotides in the library are related through, for example, their origin from a single animal species (for example, human, mouse, rabbit, goat, horse), tissue type, organ, or cell type. A "library" may comprise polynucleotides of a common genus. For example, the genus can be polynucleotides encoding an immunoglobulin subunit polypeptide of a certain type and class, e.g., a library might encode an antibody μ, γ1, γ2, γ3, γ4, α1, α2, δ, or ε heavy chain, or an antibody κ or λ light chain. Although each member of any one library described herein may encode the same heavy or light chain constant region, the library may collectively comprise at least $10^6$, $10^7$, $10^8$, $10^9$, $10^{10}$, $10^{11}$, $10^{12}$, $10^{13}$, $10^{14}$, $10^{15}$ or more or less different variable regions, i.e., a "plurality" of variable regions associated with the common constant region. The different polynucleotides in the library can also be related through, for example, their origin from a single animal species (for example, human, mouse, rabbit, goat, horse, etc.), tissue type, organ, or cell type.

The term "light chain" as used herein refers to the smaller immunoglobulin subunit which associates with the amino terminal region of a heavy chain. As with a heavy chain, a light chain comprises a variable region (VL) and a constant region (CL). Light chains are classified as either kappa or lambda (κ, λ). A pair of these can associate with a pair of any of the various heavy chains to form an immunoglobulin molecule. Also encompassed in the meaning of light chain are light chains with a lambda variable region (V-lambda) linked to a kappa constant region (C-kappa) or a kappa variable region (V-kappa) linked to a lambda constant region (C-lambda).

The terms "marker" or "reporter" refer to a gene or protein that can be attached to a regulatory sequence of another gene or protein of interest, so that upon expression in a host cell or organism, the reporter can confer certain characteristics that can be relatively easily selected, identified and/or measured. Reporter genes are often used as an indication of whether a certain gene has been introduced into or expressed in the host cell or organism. Examples of commonly used reporters include: antibiotic resistance genes, auxotropic markers, β-galactosidase (encoded by the bacterial gene lacZ), luciferase (from lightning bugs), chloramphenicol acetyltransferase (CAT; from bacteria), GUS (β-glucuronidase; commonly used in plants) and green fluorescent protein (GFP; from jelly fish). Reporters or markers can be selectable or screenable. A selectable marker (e.g., antibiotic resistance gene, auxotropic marker) is a gene confers a trait suitable for artificial selection; typically host cells expressing the selectable marker is protected from a selective agent that is toxic or inhibitory to cell growth. A screenable marker (e.g., gfp, lacZ) generally allows researchers to distinguish between wanted cells (expressing the marker) and unwanted cells (not expressing the marker or expressing at insufficient level).

"Nucleic acid," "nucleic acid sequence," "oligonucleotide," "polynucleotide" or other grammatical equivalents as used herein means at least two nucleotides, either deoxyribonucleotides or ribonucleotides, or analogs thereof, covalently linked together. Polynucleotides are polymers of any length, including, e.g., 20, 50, 100, 200, 300, 500, 1000, 2000, 3000, 5000, 7000, 10,000, etc. A polynucleotide described herein generally contains phosphodiester bonds, although in some cases, nucleic acid analogs are included that may have at least one different linkage, e.g., phosphoramidate, phosphorothioate, phosphorodithioate, or O-methylphophoroamidite linkages, and peptide nucleic acid backbones and linkages. Mixtures of naturally occurring polynucleotides and analogs can be made; alternatively, mixtures of different polynucleotide analogs, and mixtures of naturally occurring polynucleotides and analogs may be made. The following are non-limiting examples of polynucleotides: a gene or gene fragment, exons, introns, messenger RNA (mRNA), transfer RNA, ribosomal RNA, ribozymes, cDNA, cRNA, recombinant polynucleotides, branched polynucleotides, plasmids, vectors, isolated DNA of any sequence, isolated RNA of any sequence, nucleic acid probes, and primers. A polynucleotide may comprise modified nucleotides, such as methylated nucleotides and nucleotide analogs. If present, modifications to the nucleotide structure may be imparted before or after assembly of the polymer. The sequence of nucleotides may be interrupted by non-nucleotide components. A polynucleotide may be further modified after polymerization, such as by conjugation with a labeling component. The term also includes both double- and single-stranded molecules. Unless otherwise specified or required, any embodiment of this invention that is a polynucleotide encompasses both the double-stranded form and each of two complementary single-stranded forms known or predicted to make up the double-stranded form. A polynucleotide is composed of a specific sequence of four nucleotide bases: adenine (A), cytosine (C), guanine (G), thymine (T), and uracil (U) for thymine when the polynucleotide is RNA. Thus, the term "polynucleotide sequence" is the alphabetical representation of a polynucleotide molecule. Unless otherwise indicated, a particular polynucleotide sequence also implicitly encompasses conservatively modified variants thereof (e.g., degenerate codon substitutions) and complementary sequences as well as the sequence explicitly indicated. Specifically, degenerate codon substitutions may be achieved by generating sequences in which the third position of one or more selected (or all) codons is substituted with mixed-base and/or deoxyinosine residues.

"Operably linked" refers to a juxtaposition of two or more components, wherein the components so described are in a relationship permitting them to function in their intended manner. For example, a promoter and/or enhancer is operably linked to a coding sequence if it acts in cis to control or modulate the transcription of the linked sequence. Generally, but not necessarily, the DNA sequences that are "operably linked" are contiguous and, where necessary to join two protein coding regions or in the case of a secretory leader, contiguous and in frame. However, although an operably linked promoter is generally located upstream of the coding sequence, it is not necessarily contiguous with it. A polyadenylation site is operably linked to a coding sequence if it is located at the downstream end of the coding sequence such that transcription proceeds through the coding sequence into the polyadenylation sequence. Linking is accomplished by recombinant methods known in the art, e.g., using PCR methodology, by annealing, or by ligation at convenient restriction sites. If convenient restriction sites do not exist, then synthetic oligonucleotide adaptors or linkers are used in accord with conventional practice.

The terms "peptide," "polypeptide" and "protein" used herein refer to polymers of amino acid residues. These terms also apply to amino acid polymers in which one or more amino acid residues is an artificial chemical mimetic of a corresponding naturally occurring amino acid, as well as to naturally occurring amino acid polymers, those containing modified residues, and non-naturally occurring amino acid polymers. In the present case, the term "polypeptide" encompasses an antibody or a fragment thereof.

By the term "recombinant" polynucleotide or nucleic acid herein is meant a polynucleotide or nucleic acid not normally found in its natural environment, e.g., any nucleic acid comprising at least two sequences that are not present together in nature. A recombinant nucleic acid may be generated in vitro, for example by using the methods of molecular biology, or in vivo, for example by insertion of a nucleic acid at a novel chromosomal location by homologous or non-homologous recombination. It is understood that once a recombinant polynucleotide is made and reintroduced into a host cell or organism, it will replicate non-recombinantly, e.g., using the in vivo cellular machinery of the host cell rather than in vitro manipulations; however, such nucleic acids, once produced recombinantly, although subsequently replicated non-recombinantly, are still considered recombinant for the purposes of the invention.

"Recovering" is used herein to mean a crude separation of a desired species from the rest of the pool which are not desired.

"Restriction endonucleases" or "restriction enzymes" are enzymes that bind to a double-stranded nucleic acid (e.g., DNA) at one site, referred to as the recognition site, and make a single double stranded cut outside of the recognition site. The double stranded cut, referred to as the restriction site or cleavage site, is generally situated within or at short distances away from the recognition site. Some restriction sites occur frequently in DNA (e.g., every several hundred base pairs, others much less frequently (rare-cutter; e.g., every 10,000 base pairs). The recognition site is generally about 4-8 bp long. Cleavage generally produces 1-6 nucleotide single-stranded overhangs, with 5' or 3' termini, although some enzymes produce blunt ends. Such enzymes and information regarding their recognition and cleavage sites are available from commercial suppliers such as New England Biolabs. As used herein, restriction sites are "compatible" if, once cleaved by appropriate restriction enzymes, can be ligated by a DNA ligase. In some embodiments, the compatible restriction sites include those double-stranded sequences that, once cleaved by appropriate restriction enzymes, generate "sticky ends" with complementary overhang sequences that can be joined by a DNA ligase.

"Screening" used herein refers to the method in which a pool comprising the desired species is subject to an assay in which the desired species can be detected, and subsequently an aliquot of the pool in which the desired species is detected and optionally enriched is recovered or obtained.

"Surface protein" or "surface peptide" refers to an amino acid sequence that confers the ability of a polypeptide to be associated with and/or presented on the surface of a host, such as phages, yeasts, bacteria and mammalian cells. The surface protein can be a phage coat protein, a yeast outer wall protein, a bacterial outer membrane protein, a cell surface tether domain, or an adapter, or a truncation or derivative thereof. Surface proteins can be used for phage display, yeast display, bacterial display or mammalian display, or shuttling display between different hosts.

As used herein, unless otherwise stated, the term "transcription" refers to the synthesis of RNA from a DNA template; the term "translation" refers to the synthesis of a polypeptide from an mRNA template. Transcription and translation collectively are known as "expression."

The term "transfected" or "transformed" or "transduced" as used herein refers to a process by which exogenous nucleic acid is transferred or introduced into the host cell. A transformed cell includes the primary subject cell and its progeny. The host cell can be bacteria, yeasts, mammalian cells, and plant cells.

A "variable region" of an antibody refers to the variable region of the antibody light chain or the variable region of the antibody heavy chain, either alone or in combination. The variable regions of both the light (VL) and heavy (VH) chain portions determine antigen recognition and specificity. VL and VH each consist of four framework regions (FR) connected by three complementarity determining regions (CDRs) also known as hypervariable regions. The CDRs complement an antigen's shape and determine the antibody's affinity and specificity for the antigen. There are six CDRs in both VL and VH, The CDRs in each chain are held together in close proximity by the FRs and, with the CDRs from the other chain, contribute to the formation of the antigen-binding site of antibodies. There are at least two techniques for determining CDRs: (1) an approach based on cross-species sequence variability (the Kabat numbering scheme; see Kabat et al., Sequences of Proteins of Immunological Interest (5th ed., 1991, National Institutes of Health, Bethesda Md.)); and (2) an approach based on crystallographic studies of antigen-antibody complexes (the Chothia numbering scheme which corrects the sites of insertions and deletions (indels) in CDR-L1 and CDR-H1 suggested by Kabat; see Al-lazikani et al. (1997) J. Molec. Biol. 273:927-948)). Other numbering approach or scheme can also be used. As used herein, a CDR may refer to CDRs defined by either approach or by a combination of both approaches or by other desirable approaches. In addition, a new definition of highly conserved core, boundary and hyper-variable regions can be used.

As used herein, the term "vector" refers to a nucleic acid molecule capable of transporting another nucleic acid to which it has been linked. A vector includes any genetic element, such as a plasmid, phage vector, phagemid, transposon, cosmid, chromosome, artificial chromosome, episome, virus, virion, etc., capable of replication when associated with the proper control elements and which can transfer gene sequences into or between hosts. One type of vector is an episome, i.e., a nucleic acid capable of extrachromosomal replication. Another type of vector is an integrative vector that is designed to recombine with the genetic material of a host cell. Vectors may be both autonomously replicating and integrative, and the properties of a vector may differ depending on the cellular context (i.e., a vector may be autonomously replicating in one host cell type and purely integrative in another host cell type). Vectors generally contain one or a small number of restriction endonuclease recognition sites and/or sites for site-specific recombination. A foreign DNA fragment may be cleaved and ligated into the vector at these sites. The vector may contain a marker suitable for use in the identification of transformed or transfected cells. For example, markers may provide antibiotic resistant, fluorescent, enzymatic, as well as other traits. As a second example, markers may complement auxotrophic deficiencies or supply critical nutrients not in the culture media.

Other terms used in the fields of recombinant nucleic acid technology, microbiology, immunology, antibody engineering, and molecular and cell biology as used herein will be generally understood by one of ordinary skill in the applicable arts.

Display and Selection

Display technology is used to present different recombinant polypeptides on the surface of a host such as phages, yeasts, bacteria and mammalian cells. Various display vectors are used to express and display an insert in the vector as part of a fusion protein on the surface of the host. By exposing a plurality of such fusion proteins to a target, various in vitro selection processes generally known in the art can then be used to identify affinity binders to the target.

One commonly selection process is known as biopanning. The first step of biopanning is to construct display libraries. The diversity or size of the library can be $10^6$, $10^7$, $10^8$, $10^9$, $10^{10}$, $10^{11}$, $10^{12}$, $10^{13}$, $10^{14}$, $10^{15}$, or more or less different members (e.g., polynucleotides). Library construction involves inserting desired genes or reading frames into display vectors described herein. The inserts can encode an antibody fragment. For example, the inserts can be a plurality of random mutations or degenerate oligonucleotides designed to introduce variations/mutations into an antibody fragment (for example, each CDR region). The inserts can also be flanked by two restriction sites to facilitate cloning. The restriction sites can be selected to achieve high efficiency cloning (e.g., above about 80%, above about 85%, above about 90%, or above about 95%).

In some embodiments, the display library can be constructed using a vector containing a recombinant polynucleotide of the present invention. The recombinant polynucleotide can include from 5' to 3': a first nucleic acid sequence (or insert) encoding an amino acid or polypeptide sequence to be displayed on a surface; a first pre-selected restriction site; a second nucleic acid sequence encoding a surface protein for display; and a second pre-selected restriction site. These components can be operably linked together and to the vector. In some embodiments, when cleaved by corresponding restriction endonuclease thereto, the first and second restriction sites produce compatible sticky ends.

In certain embodiments, the first and second restriction site can be selected to each encode amino acids that do not interfere with binding affinity of the amino acid or polypeptide sequence to a target and/or display of the surface protein. Where the first nucleic acid sequence encodes an antibody fragment, the first and second restriction sites can be selected according to one or more of the following criteria:

(1) The restriction site is rarely present in human germline Vκ, Vλ or VH;
(2) The restriction site is not present in the library (e.g., the six CDR regions);
(3) After cleavage, a sticky end (e.g., 4-base sticky end) is exposed. In some instances, a 4-base sticky end is expected to increase self-ligation efficiency than other sticky ends (e.g., 2-base sticky end) or blunt ends;
(4) The restriction site does not encode any in-frame stop codons, and it encodes amino acids that are compatible with the structure of antibody fragment (for example, no Cys is allowed);
(5) The sites are unique in the vector;
(6) The corresponding restriction enzyme can be inactivated (e.g., at higher temperature such as 65° C.); and/or
(7) The corresponding the restriction enzyme is inexpensive yet robust, and lacks star activity.

For example, the first and second restriction site can be selected to meet all of the criteria above. Such sites, in the case of phagemid Fad22 exemplified herein, include XbaI, NcoI, SalI and XhoI sites. In one embodiment, the first restriction site is XbaI site. In some embodiments, the second restriction site is XbaI site. For other vectors, one of ordinary skill in the art would be able to follow the criteria above to select appropriate restriction sites.

In certain embodiments, the first nucleic acid sequence can be an open reading frame and can be engineered in-frame with the second nucleic acid sequence such that a fusion protein expressing both sequences can be produced upon expression. Such fusion protein can then be presented on a surface of a host. To facilitate surface presentation, the second nucleic acid sequence can be selected to encode a surface protein such as a phage coat protein, a yeast outer wall protein, a bacterial outer membrane protein, or a cell surface tether domain, or a truncation or derivative thereof. For example, gene III of filamentous phage M13, or a truncation or derivative thereof, can be used. Accordingly, the surface protein enables phage display, yeast display, bacterial display or mammalian display, or shuttling display therebetween.

In various embodiments, a display vector for high-throughput conversion into expression vector is provided. The display vector can contain the recombinant polynucleotide described above, as well as a fusion tag sequence 3' to the second restriction site. In some embodiments, the fusion tag sequence can be engineered such that upon (a) removal of the second nucleic acid sequence by cleaving the first and second restriction site, and (b) religation of the compatible sticky ends produced therefrom, the first nucleic acid sequence is in-frame with the fusion tag sequence. Exemplary fusion tag sequence include one or more of: an alkaline phosphatase tag, an AviTag, a cutinase tag, a halotag, a flag tag, a c-myc tag, a histidine tag, a GST tag, a green fluorescent protein tag, an HA tag, an E-tag, a Strep tag, a Strep tag II, a YoI 1/34 tag, and other tags known by one of ordinary skill in the art. Fusion tag sequences can be operably linked to other elements in the vector. In some embodiments, specific restriction sites can be selected to flank the fusion tag sequences, to facilitate exchange and/or cloning. For example, as shown in FIG. 1, a FlagHis6 tag is used in the Fad22 phagemid. The FlaHis6 tag is flanked by a SaiI site (e.g., upstream) and an XbaI site (e.g., downstream). The sites can be engineered through silent mutagenesis. In addition, the SalI site is placed immediately downstream of and is the closest restriction site to the C-terminus of the CH1 domain. These sites can facilitate the convenient exchange of tags downstream of CH1. Many other restriction sites, in addition to SaiI or in replacement of SalI, can also be introduced downstream and outside of the CH1 ORF to facilitate introduction and removal of various vector elements.

During display library construction, a library of display vectors can be used, in which each display vector can contain a unique first nucleic acid sequence that encode a unique peptide or antibody fragment.

Once a library is constructed, the next step of biopanning is the capturing or panning step where the displayed peptide binds to a desired target. Panning utilizes the binding interactions between an affinity binder presented by the host with its target, so that only specific peptides that have a binding affinity are bound to the target. The target is usually attached to or fixed in a solid phase, either directly or indirectly. For example, antibodies presented by bacteriophage can be selected with coated antigen in microtiter plates. After the capturing step, a mild washing step is generally used to wash away the unbound hosts that do not present affinity binders on their surfaces; only the bound hosts with desired affinity remain. The final step involves an elution or recovering step where the bound hosts are eluted through protease cleavage, changing of pH or other environmental conditions. The end result is that specific peptides displayed on the bound hosts are collected and analyzed. The cycle can occur many times (e.g., with increasingly stringent wash conditions) to screen for strong affinity binders to the target.

Other in vitro selection processes can also be used. For example, various markers or reporters can facilitate selection. One commonly used reporter is the GFP protein, where affinity binders can be selected through fluorescence-activated cell sorting (FACS).

In some embodiments, after an affinity binder is recovered, the corresponding polynucleotide needs to be expressed, sequenced, and/or further characterized. Using the vectors of the present invention, display vectors can be converted to expression vectors in a simple cleavage-religation step, eliminating the need to subclone the polynucleotide of interest. Thus, the present invention provides an attractive alternative for more efficient and faster downstream evaluation of affinity binders.

Conversion Vector in Phage Display

In the sections below, a detailed description is provided with regard to phagemid vectors. It should be understood by a person or ordinary skill in the art, however, that the description is equally applicable to other types of vectors using standard molecular cloning techniques. For example, discussions about the phage (e.g., M13 phage) coat proteins (e.g., GP3, GP8 or GP7) are equally applicable to the other surface proteins such as yeast outer wall proteins, bacterial outer membrane proteins, cell surface tether domains or adapters. It should also be understood that description below are applicable to various antibodies and antibody fragments (including, for example, Fab, Fab' Fd, Fd', Fv, dAb, isolated CDR regions, $F(ab')_2$, and scFv). Furthermore, the antibody fragments identified using the vectors and methods of the present invention can be used to construct various forms of antibodies, such as humanized antibodies, chimeric antibodies, and any other modified configuration of the immunoglobulin molecule that comprises an antigen recognition site of the required specificity.

Similarly, although the description provided below focuses on isolation of polynucleotide encoding an antibody or antibody fragment specifically recognizing an antigen, the methods are equally applicable to isolation of polynucleotides encoding a polypeptide (such as an antibody) with other desired properties, which include, for example, specific binding to a partner, higher binding affinity to a binding partner, antibody-dependent cellular cytotoxicity (ADCC), complement-dependent cytotoxicity (CDC), agonist or antagonist functions, induction or inhibition of apoptosis, angiogenesis, proliferation, activation of inhibition of signaling pathway. Multiple properties may be screened simultaneously or individually. Assay methods for these desired properties are known in the art.

The phage display method is a technology used for studying interactions of proteins. This technology is based on expressing on the surface of a phage (display) the binding protein of interest and selecting said binding protein on its capacity to form a complex with a binding partner. In general, there are two types of vectors for displaying the binding proteins, phage vector and phagemid vector, resulting in multivalent phage or monovalent phage, respectively.

In the first method involving phage vector, the principle relies on the genetic recombination of the phage genome: a sequence encoding a binding protein of interest is inserted into said phage genome. The sequence insertion is localized next to a gene encoding a protein forming the coat protein complex of the phage. Said coat is composed of different proteins, such as GP3 and GP8 proteins which are the most commonly used. The insertion of a sequence of interest next to the gene encoding these coat proteins enables the fusion of the binding protein of interest to the coat protein of the phage. The recombinant phage (i.e., a phage vector) then infects bacteria, and its genome is replicated therein. The expression of the recombinant phage genome leads to the production of phages expressing on their surface the heterologous binding protein to be screened, in which all copies of the coat protein display the heterologous protein (i.e., the heterologous protein is displayed in the multiple on a given phage, or multivalently). During the steps of screening, different proteins or molecules, referred to as targets or binding partners, are brought into contact with said protein of interest. When a complex is formed between the binding protein on the surface of the phage and a binding partner, the complex is purified and the nucleotidic sequence encoding the binding protein of interest can then be determined from the recombinant phage genome.

Exemplary phage vectors include M13IX30, M13IX11, M13IX34, M13IX13 or M13IX60 described in International Patent Publication No. WO92/06204, and any derived phage vectors such as the vector 668-4 used in a method for generating multivalent display library described in the U.S. Pat. No. 6,057,098. Although most phage display methods have used filamentous phage, lambdoid phage display systems (WO 95/34683; U.S. Pat. No. 5,627,024), T4 phage display systems (Ren et al., Gene, 215: 439 (1998); Zhu et al., Cancer Research, 58(15): 3209-3214 (1998); Jiang et al., Infection & Immunity, 65(11): 4770-4777 (1997); Ren et al., Gene, 195(2):303-311 (1997); Ren, Protein Sci., 5: 1833 (1996); Efimov et al., Virus Genes, 10: 173 (1995)) and T7 phage display systems (Smith and Scott, Methods in Enzymology, 217: 228-257 (1993); U.S. Pat. No. 5,766,905) are also known.

The second phage display method combines the use of phagemid (display) vectors and helper phages for the generation of libraries of phages expressing on their surface a binding protein of interest. Phagemid vectors comprise the sequence encoding the binding protein of interest and phage sequences, especially the sequence encoding the coat protein to be fused with the binding protein of interest (i.e., the displayed protein fusion gene), which is cloned into a small plasmid. Phagemid vectors are also constituted of different functional sequences for the replication of the phage genome (e.g., phage replication origin such as Ff or fl origin) and the maintenance of the vector in the host cell (e.g., plasmid replication origin such as pBR322 or pMB1). The phagemid vectors do not contain the whole phage genome, which is why this method is combined with the use of a helper phage for the production of phages expressing binding proteins as a fusion on their surface. The helper phage, upon infection of the host cell (e.g., *E. coli*), enables the replication and packaging of the phage genome by complementing proteins from the complete phage genome that is absent in the phagemid. Commercially available helper phage includes M13K07 from New England Biolabs and R408 and VCSM13 from Stratagene, which typically have mutations that reduce packaging efficiency, to ensure phagemid genomes are preferentially packaged. In addition, engineered helper phage with complement adapter or adapters to prevent contamination from unrelated phage or phagmid particles. As a result of the use of helper phages, all wide-type phage proteins from the helper phage genome, as well as a small amount of the fusion protein encoded by the phagemid are expressed, so that phage particles extruded by the cells contain both proteins, usually with the wild-type in considerable excess. A typical preparation of phage particles from *E. coli* harboring a GP3 phagemid display vector and infected with helper phage will exhibit a Poisson distribution of fusion protein expression: 10% or less of the particles will display one copy of the fusion protein; a very small percentage will display two copies; and the remaining majority of the particles will display only wild-type GP3 and no fusion protein. Thus, the main displaying species is monovalent, while most particles do not display at all.

The valency of display is important primarily due to its impact on the ability to discriminate binders of differing affinities. Early work showed that multivalent display prevented the highest-affinity clones in a selection form being identified, because multivalency conferred a high apparent affinity (avidity) on weak0binding clones. Monovalent display allows selection based on pure affinity, and is therefore generally preferred for the many studies where the aim is to identify the tightest binding variants from a library. Conversely, in applications where the initial selectants are of law affinity for example, the de novo selection of peptides that bind a given target multivalency increases the changes of isolating rare and weakly binding clones. A frequently used strategy is to start with multivalent display, and then move to monovalent display as the affinity of the displayed peptides matures.

The use of a helper phage can be eliminated by using the bacterial packaging cell line technology, which is described in detail in U.S. Pat. No. 8,227,242, the entire disclosure incorporated herein by reference.

In addition to selecting suitable vectors for constructing a library of mutants, sorting phage libraries of mutants also requires a strategy for constructing and propagating a large number of variants, a procedure for affinity purification using the target receptor, and a means of evaluating the results of binding enrichments. See U.S. Pat. Nos. 5,223, 409; 5,403,484; 5,571,689; and 5,663,143.

Many other improvements and variations of the basic phage display concept have now been developed. These improvements enhance the ability of display systems to screen peptide libraries for binding to selected target molecules and to display functional proteins with the potential of screening these proteins for desired properties. Combinatorial reaction devices for phage display reactions have been developed (WO 98/14277) and phage display libraries have been used to analyze and control bimolecular interactions (WO 98/20169; WO 98/20159) and properties of constrained helical peptides (WO 98/20036). WO 97/35196 describes a method of isolating an affinity ligand in which a phage display library is contacted with one solution in which the ligand will bind to a target molecule and a second solution in which the affinity ligand will not bind to the target molecule, to selectively isolate binding ligands. WO 97/46251 describes a method of biopanning a random phage display library with an affinity purified antibody and then isolating binding phage, followed by a micropanning process using microplate wells to isolate high affinity binding phage. WO 97/47314 describes the use of substrate subtraction libraries to distinguish enzyme specificities using a combinatorial library which may be a phage display library. A method for selecting enzymes suitable for use in detergents using phage display is described in WO 97/09446. Additional methods of selecting specific binding proteins are described in U.S. Pat. Nos. 5,498,538 and 5,432,018, and WO 98/15833. In addition, adaptor directed display and cross-species display, including but not limited to those described in Wang et al, Adapter-Directed Display: A Modular Design for Shuttling Display on Phage Surfaces, *J. Mol. Biol* (2010) 395, 1088-1101 and Wang et al., Yeast surface display of antibodies via the heterodimeric interaction of two coiled-coil adapters, *Journal of Immunological Methods* (2010) 354, 11-19, can also be used in the present invention.

Methods of generating peptide libraries and screening these libraries are also disclosed in U.S. Pat. Nos. 5,723,286; 5,432,018; 5,580,717; 5,427,908; 5,498,530; 5,770,434; 5,734,018; 5,698,426; 5,763,192; and 5,723,323.

Typically, phage display is achieved through fusions of an antibody fragment to one of the coat proteins on M13 phage, such as GP3, GP8, or GP7. In one embodiment of the present invention, a phagemid named Fad22 is constructed, where the GP3 C-terminal ("CT") fragment is used instead of full-length GP3 protein. The GP3 CT fragment has been shown to be less toxic than full-length GP3, while equally efficient in displaying antibody fragment on phage surface.

Using recombinant polynucleotides and vectors described herein, phage display libraries can be constructed. For example, restriction sites can be selected to flank the GP3 CT fragment. Such sites, in the case of phagemid Fad22 exemplified herein, include XbaI, NcoI, SalI and XhoI sites. In one embodiment, the first restriction site is XbaI site. In some embodiments, the second restriction site is XbaI site.

A desired affinity binder (e.g., an antibody fragment) to a target can be identified through screening and recovering steps such as the biopanning process described above. Next, it is often necessary to express the antibody fragment without the GP3 CT fragment in a host (e.g., *E. coli*) in order to further purify and characterize the antibody fragment. There are generally two approaches to achieve this goal.

The first approach is a genetic approach, in which an amber stop codon (TAG) is inserted between the gene encoding the antibody fragment and that encoding the GP3 fragment. In a bacterial suppressor strain (such as TG1 or ER2738) used for phage screening, a genetic allele SupE suppresses the amber stop codon and insert an amino acid (usually a glutamine) instead, thus allowing surface display of the antibody fragment through the GP3 fragment. In a non-suppressing bacterial strain (such as HB2151) commonly used to for expression, however, the bacterial translation machinery ribosome stops at the amber stop codon between the antibody fragment and the GP3 fragment, which results in the synthesis and export to bacterial periplasm of the antibody fragment, but not its fusion with GP3 fragment. The advantage of this approach is that no further manipulation of display vector is required. Instead, the antibody fragment can be expressed in *E. coli* by simply moving the same display vector from an amber-suppressing strain to a non-suppressing strain. However, this approach also has several disadvantages: (a) The suppression efficiency is strain dependent, and usually is less than 30%, which reduces phage display efficiency; (b) the amber stop codon is not a strong termination codon and thus, there is leaky read-through even in a non-suppressing strain, resulting in lower yield of soluble antibody fragments in bacterial periplasm; and (c) because antibody fragments containing internal amber stop codons are also displayed and selected in suppressing strains, these internal amber stop codons must be replaced with other codons through a laborious and expensive site-directed mutagenesis process, in order for these antibody fragments to be expressed in non-suppressing strains.

The second "cleavage-religation" approach differs from the above-mentioned approach in that, after the display vector is extracted from *E. coli*, the vector is digested with a specific restriction enzyme to release the GP3 fragment, and then the vector is self-ligated using T4 DNA ligase, followed by transformation into specific competent *E. coli* strains for expression. Pershad et al. (Anal. Biochem. 412 (2011): 210-216) used MfeI, an infrequently used and relatively expensive restriction enzyme to excise GP3 coding sequence from phage display vector. MfeI enzyme is also known to display star activity (NEB), and its High Fidelity version MfeI-HF reduces but does not eliminate the star activity. In addition, MfeI restriction site, CAATTG encodes Gln and Leu, and it is known that Gln is susceptible to posttranslational modifications such as deamidation, which may adversely affect the structure and function of the affinity binder.

In contrast to MfeI, the vector of the present invention utilizes restriction site having one or more of the following advantages:
(1) The restriction site is rarely present in human germline Vκ, Vλ or VH;
(2) The restriction site is not present in the library (e.g., the six CDR regions);
(3) The restriction site encodes amino acids that are compatible with the structure of affinity binder such as antibody fragment;
(4) The sites are unique in the vector; and/or
(5) The corresponding the restriction enzyme is inexpensive yet robust, and lacks star activity.

Using recombinant polynucleotides and vectors of the present invention, display vectors can be converted to expression vectors in a high-throughput, high-efficiency fashion. In some embodiments, a method of converting a display vector to an expression vector. Such method includes: providing the display vector described herein; cleaving the first and second restriction site with corresponding restriction endonuclease thereto, thereby producing compatible sticky ends; and religating the compatible sticky ends to produce an expression vector in which the first nucleic acid sequence is in-frame with the fusion tag sequence.

The method can further include additionally cleaving within the second nucleic acid sequence to increase religation efficiency in the religating step. Such cleaving may produce blunt ends that are less likely to ligate than sticky ends.

In some embodiments, the product from the cleaving step can be diluted before the religating step, to increase religation efficiency. The dilution can be with water, e.g., 1:10 or 1:20 or 1:100 with water, to facilitate intramolecular interaction (i.e., vector religation) over intermolecular interactions (i.e., ligation between the vector and the GP3 fragment).

After the religating step, the expression vector can be introduced into a host, to further characterize the first nucleic acid sequence, including expressing a corresponding peptide in the host or subjecting the first nucleic acid sequence to sequencing. In some embodiments, the providing, cleaving, religating and introducing steps can be completed in less than 12 hours, less than 8 hours, or less than 4 hours.

In the context of library screening and selection, a plurality of (e.g., hundreds or thousands) display vectors can be converted to a plurality of expression vectors in parallel, and the plurality of expression vectors can be introduced into a population of hosts. Thus, methods of the present invention can be performed in a high-throughput fashion. In some embodiments, the conversion rate from the plurality of display vectors to the plurality of expression vectors can be higher than 80%, higher than 85%, higher than 90%, higher than 92%, higher than 95% or higher than 98%. Because of the near 100% conversion rate, parallel processing of hundreds or thousands or millions of individual colonies can be achieved (e.g., in individual 96-well plates), eliminating the need to further characterize each single colony and enhancing throughput dramatically.

A method of identifying an affinity binder to a target is additionally provided by the present invention. The method can include screening a population of first hosts each containing the display vector described herein, to obtain a subpopulation of first hosts having binding affinity to a target. Each first host displays, on a surface thereof, an amino acid sequence encoded by a unique first nucleic acid sequence in the display vector. The subpopulation of first hosts each display an affinity binder to the target. The method also includes converting display vectors isolated from the subpopulation of first hosts to expression vectors by cleaving the first and second restriction site to remove the second nucleic acid sequence and religating the compatible sticky ends produced therefrom. The method additionally includes introducing the expression vectors into a population of second hosts, to further characterize the affinity binder. In various embodiments, the method is performed in a high-throughput fashion. For example, the conversion rate of the converting step can be higher than 80%, higher than 85%, higher than 90%, higher than 92%, higher than 95% or higher than 98%.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

EXAMPLES

In an exemplary design of Fad22 (FIG. 1), two XbaI restriction sites were engineered to flank the GP3 C-terminal fragment (labeled "GP3CT"). One XbaI site (XbaI (4116)) is placed upstream of the GGT codon 253 (encoding Gly) of GP3, while the other XbaI site (XbaI (3645)) is positioned downstream of two stop codons (TGA TAA) placed after the TCT codon 406 (encoding Ser) of GP3. The XbaI restriction site is chosen because it fulfills the following criteria:
(1) It is rarely present in human germline Vκ, Vλ or VH;
(2) It is not present in the library (e.g., the six CDR regions);
(3) After cleavage, a 4-base sticky end, instead of a 2-base sticky end or a blunt end, is exposed. A 4-base sticky end in some embodiments can increase self-ligation efficiency;
(4) The XbaI site (TCTAGA) encodes amino acid Serine and Arginine that are compatible with the structure of antibody fragment;
(5) The two XbaI sites are the only two XbaI sites present in Fad22;
(6) The restriction enzyme XbaI can be inactivated at 65° C.;
(7) The restriction enzyme XbaI is inexpensive yet robust, and lacks star activity.

Still referring to FIG. 1, the Fad22 phagemid contains two origins, one or phage replication (f1 ori) and the other for plasmid replication (pMB1 ori). Fad 22 also contains a Bla marker gene which encodes b-lactamase and confers resistance against b-lactam antibiotics (penicillin, ampicillin, etc.). A lac promoter (Plac) is placed upstream of the fusion gene (of an antibody fragment encoding gene and the GP3CT gene). The antibody fragment (e.g., Fab) encoding gene can comprise various domains of interest, such as Vκ1, CL, VH3 and CH1 domains as shown in FIG. 1. These domains can be arranged in any suitable order for expression of the antibody fragment. Each domain has one or more mutations introduced therein, producing a library of mutants. Two ribosome binding sites (RBS1 and RBS2) and two secretion signal sequences (SS1 and SS2) are also included in Fad22, upstream of Vκ1-CL and VH3-CH1, respectively, to facilitate translation and secretion thereof.

In one example, after 20-fold overdigestion of Fad22 with XbaI, more than 95% of the DNA fragments can be ligated and recut. Additional enzymes that can be used include NcoI, SaII and XhoI.

Figure 2:
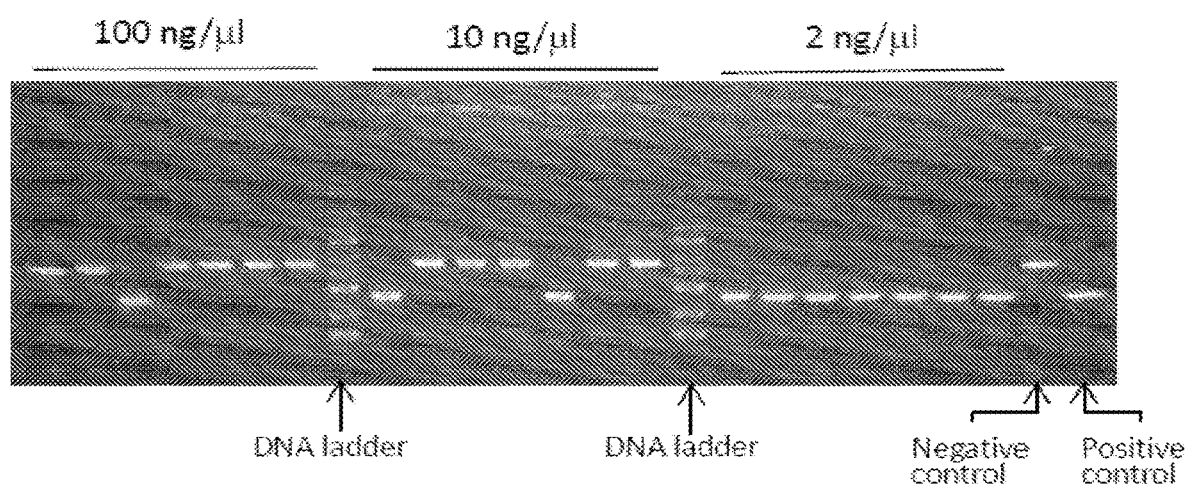
FIG. 2 provides a gel electrophoresis image showing the conversion rate of an exemplary vector at different concentrations. One restriction enzyme, XbaI was used.

It was demonstrated that with XbaI digestion, followed by self-ligation with T4 DNA ligase, almost 100% conversion of display vector into expression vector can be achieved when the starting phagemid concentration is equal to or lower than 2 ng/μl (FIG. 2). However, when the starting phagemid concentration is at or higher than 10 ng/μl, the conversion rate is lower than 50% (FIG. 2). This result may be explained by the fact that higher concentration favors intermolecular ligation, instead of intramolecular self-ligation.

Figure 3:
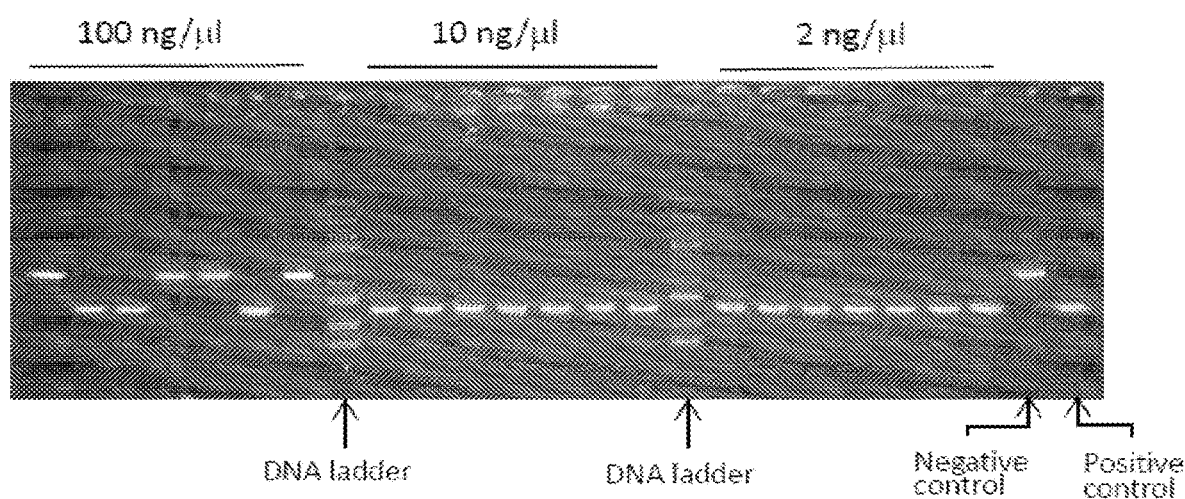
FIG. 3 provides a gel electrophoresis image showing the conversion rate of an exemplary vector at different concentrations. Two restriction enzymes, XbaI and XmnI were used.

Conversion efficiency is further improved by using a combination of two restriction enzymes such as XbaI and XmnI. The XmnI (GAATAATTTC) site is present in the gene encoding GP3 C-terminal fragment, and digestion by XmnI restriction enzyme yields a blunt end that is more difficult to ligate than sticky ends (as produced by XbaI). Experiments demonstrated that with the combination of XbaI and XmnI, followed by self-ligation with T4 DNA ligase, almost 100% conversion of display vector into expression vector were achieved even when the starting phagemid concentration is about 10 ng/μl (FIG. 3), which is significantly higher than the results at 10 ng/μl when only XbaI is used (FIG. 2). Therefore, the combination of XbaI and XmnI dramatically extends the range of starting phagemid concentration, and improves the robustness of this cleavage-religation approach, especially in high-throughput settings where hundreds of, or even thousands of phagemid samples are processed in parallel, and where the starting phagemid concentrations routinely vary by several fold.

EQUIVALENTS

The present invention provides among other things novel methods and vectors for high-throughput screening and selection. While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

INCORPORATION BY REFERENCE

All publications, patents and sequence database entries mentioned herein are hereby incorporated by reference in their entirety as if each individual publication or patent was specifically and individually indicated to be incorporated by reference.

The invention claimed is:

1. A method of converting a display vector to an expression vector, comprising:
   providing a display vector comprising: (a) a recombinant polynucleotide comprising, from 5' to 3':
   (i) a first nucleic acid sequence encoding an amino acid sequence to be displayed on a surface;
   (ii) a first restriction site selected from the group consisting of XbaI, NcoI, SaII and XhoI sites;
   (iii) a second nucleic acid encoding a surface peptide GP3 C-terminal fragment which comprises an XmnI restriction site; and
   (iv) a second restriction site selected from the group consisting of XbaI, NcoI, SaII and XhoI sites;
   wherein the first nucleic acid sequence is engineered in-frame with the second nucleic acid sequence, and wherein the first and second restriction sites produce compatible sticky ends when cleaved by corresponding restriction endonucleases; and
   (b) a fusion tag sequence 5' to the first restriction site or 3' to the second restriction site;
   cleaving the first and second restriction site with corresponding restriction endonuclease thereto, thereby producing said compatible sticky ends, and further cleaving within the second nucleic acid sequence by an Xml restriction endonuclease, thereby creating blunt ends; and
   religating the compatible sticky ends to produce an expression vector in which the first nucleic acid sequence is in-frame with the fusion tag sequence;
   wherein cleaving within the second nucleic acid sequence increases religation efficiency in the religating step; and
   wherein the concentration of the display vector is at or above 10 ng/μL.

2. The method of claim 1, further comprising, before the religating step, diluting a product from the cleaving step.

3. The method of claim 1, further comprising, after the religating step, introducing said expression vector into a host, to further characterize the first nucleic acid sequence.

4. The method of claim 3, wherein said further characterization includes sequencing the first nucleic acid sequence and/or expressing the first nucleic acid sequence.

5. The method of claim 3, further comprising converting a plurality of display vectors to a plurality of expression vectors in parallel, and introducing said plurality of expression vectors into a population of hosts, thereby performing said method in a high-throughput fashion.

6. The method of claim 5, wherein a conversion rate from the plurality of display vectors to the plurality of expression vectors is higher than 90% or 95%.

* * * * *